United States Patent
McCalpin et al.

(10) Patent No.: US 8,099,557 B2
(45) Date of Patent: Jan. 17, 2012

(54) PUSH FOR SHARING INSTRUCTION

(75) Inventors: John D. McCalpin, Round Rock, TX (US); Patrick N. Conway, Los Altos, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 985 days.

(21) Appl. No.: 12/037,595

(22) Filed: Feb. 26, 2008

(65) Prior Publication Data

US 2009/0216950 A1    Aug. 27, 2009

(51) Int. Cl.
*G06F 12/00* (2006.01)

(52) U.S. Cl. . 711/130; 711/121; 711/122; 711/E12.038; 711/E12.039; 711/E12.043

(58) Field of Classification Search .......... 711/141, 711/121, 122, 130, E12.037–E12.039, E12.043
See application file for complete search history.

(56) References Cited

U.S. PATENT DOCUMENTS

| | | | |
|---|---|---|---|
| 6,347,363 B1* | 2/2002 | Arimilli et al. | 711/150 |
| 7,039,760 B2 | 5/2006 | Arimilli et al. | |
| 7,155,572 B2 | 12/2006 | Hughes et al. | |
| 7,194,587 B2 | 3/2007 | McCalpin et al. | |
| 2004/0128450 A1* | 7/2004 | Edirisooriya et al. | 711/141 |
| 2005/0027941 A1* | 2/2005 | Wang et al. | 711/121 |
| 2005/0138613 A1 | 6/2005 | Archambault et al. | |
| 2007/0168639 A1 | 7/2007 | McCalpin et al. | |
| 2008/0104325 A1* | 5/2008 | Narad et al. | 711/122 |
| 2008/0229009 A1* | 9/2008 | Gaither et al. | 711/113 |

OTHER PUBLICATIONS

Sevin Fide, et al., "Proactive Use of Shared L3 Caches to Enhance Cache Communications in Multi-Core Processors," IEEE Computer Architecture Letters, vol. 7., No. 2, Jul.-Dec. 2008, pp. 57-60.
AMD, "AMD 64-Bit Technology, AMD x86-64 Architecture, Programmer's Manual vol. 3, General-Purpose and System Instructions," Publication No. 24594, Revision, 3.02, Aug. 2002, pp. 100-101.

\* cited by examiner

*Primary Examiner* — Shane M Thomas
(74) *Attorney, Agent, or Firm* — Lawrence J. Merkel; Meyertons, Hood, Kivlin, Kowert & Goetzel, P.C.

(57) ABSTRACT

In one embodiment, a system comprises a first processor, a main memory system, and a cache hierarchy coupled between the first processor and the main memory system. The cache hierarchy comprises at least a first cache. The first processor is configured to execute a first instruction, including forming an address responsive to one or more operands of the first instruction. The system is configured to push a first cache block that is hit by the first address in the first cache to a target location within the cache hierarchy or the main memory system, wherein the target location is unspecified in a definition of the first instruction within an instruction set architecture implemented by the first processor, and wherein the target location is implementation-dependent.

19 Claims, 3 Drawing Sheets

PUSH FOR SHARING INSTRUCTION

BACKGROUND

1. Field of the Invention

This invention is related to the field of processors and caching, and more particularly to cache management instructions.

2. Description of the Related Art

The rapid increase in operating frequency and performance of general purpose processors has been at the heart of increased computer system performance. At the same time, the amount of system memory (e.g. in the form of dynamic random access memory, or DRAM, of various types) has been increasing in size. However, the memory latency has not decreased to match the increases in processor performance. The latency of memory access is often a performance limiter.

To reduce the average memory latency, caches have been implemented within processors and/or in other locations that are logically between the processors and the system memory. Generally, the caches are small, low latency memories. Recently accessed data is typically stored in the cache, available for low latency access (as compared to system memory latency) by the processors.

While caches were originally designed to be transparent to the software executed by the processors, providing some cache management instructions has become common. The cache management instructions generally permit software to force data from main memory into the cache, or to force data stored in the cache out of the cache (either by invalidating the data in the cache, or writing the data back to the main memory).

SUMMARY

In one embodiment, an apparatus comprises at least a first processor and a second processor, a first cache coupled to the first processor, and a second cache coupled to the first cache. The first cache is private to the first processor, and the second cache is shared by at least the first processor and the second processor. The first processor is configured to execute a first instruction, including forming an address responsive to one or more operands of the first instruction. Responsive to a hit on a first cache block in the first cache by the address, the first cache is configured to transmit the first cache block to the second cache. The second cache is configured to retain the first cache block responsive to its transmission in response to the first instruction, and the first cache is configured to invalidate the first cache block in the first cache for at least one cache state in the first cache.

In another embodiment, a system comprises a first processor, a main memory system, and a cache hierarchy coupled between the first processor and the main memory system. The cache hierarchy comprises at least a first cache. The first processor is configured to execute a first instruction, including forming an address responsive to one or more operands of the first instruction. The system is configured to push a first cache block that is hit by the first address in the first cache to a target location within the cache hierarchy or the main memory system, wherein the target location is unspecified in a definition of the first instruction within an instruction set architecture implemented by the first processor, and wherein the target location is implementation-dependent.

BRIEF DESCRIPTION OF THE DRAWINGS

The following detailed description makes reference to the accompanying drawings, which are now briefly described.

Figure 1:
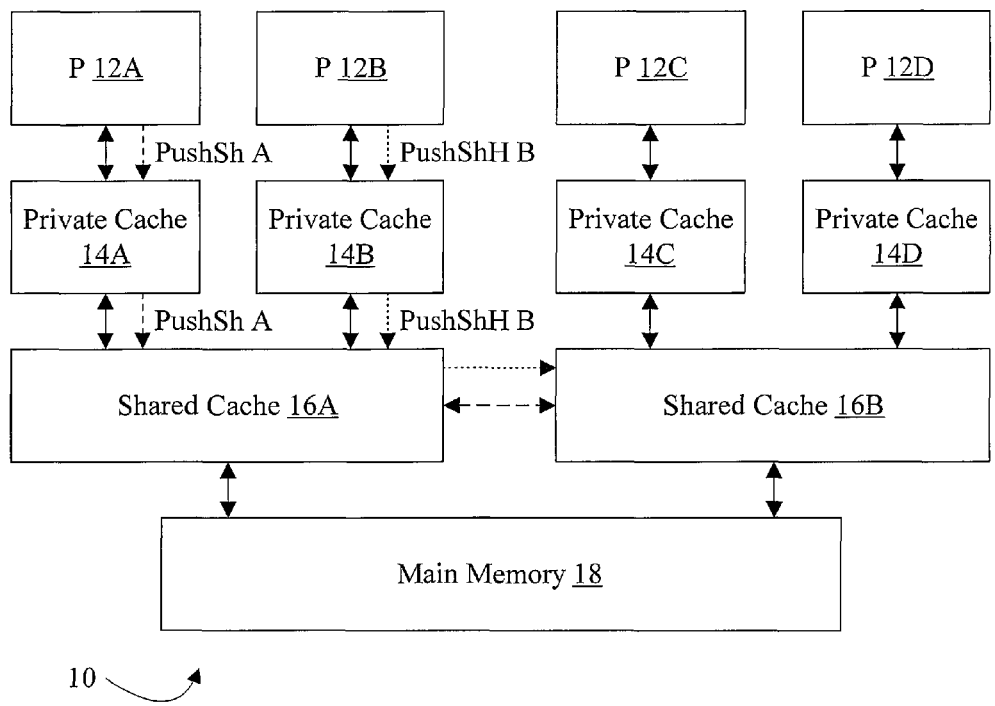
FIG. 1 is a high level block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In one embodiment, a processor and its associated cache hierarchy support a push for sharing (PushSh) instruction. The PushSh instruction may be defined in the instruction set architecture of the processor to potentially move a cache block from one location in the cache hierarchy to another location (referred to as a target location of the PushSh instruction). The target location may be either in another cache or in the main memory system, and may be an implementation-dependent location. That is, the architectural definition of the PushSh instruction does not specify the target location, allowing designers to chose an effective target location for a given processor/cache hierarchy. The architectural definition of the PushSh instruction is independent of the cache hierarchy and main memory subsystem that may be provided in a given system.

In one embodiment, the cache hierarchy may include multiple cache levels. The cache levels may be viewed from the point of view of the processor, with level 1 (or L1) being the first cache that is searched for a cache block corresponding to a given address, level 2 (or L2) being the second cache that is searched (e.g. if the cache block is not found in the L1 cache or has insufficient cache state to perform the desired access), etc. Some cache levels may include caches that are private to a given processor (e.g., only that processor may directly search the private caches for a given address, although other caches may be snooped for coherence purposes). Other levels may be shared by the processor and one or more other processors in the system (e.g. each processor that shares the cache may directly search for a given address in the shared cache). For such an embodiment, one implementation of the PushSh instruction may search each private cache and may push the cache block (if found in the private caches) to a cache level having a shared cache. For example, in a chip multiprocessor implementation, the shared cache may be shared with other processors on the same chip (e.g. all the other processors, or a subset of the other processors). In an implementation in which processors are arranged into a node (whether or not the node is a chip multiprocessor), the shared cache may be shared among processors in the node.

Pushing a cache block from one cache to a target location may refer to transferring the cache block from the cache to the target location. For at least some cache states in the source cache, the cache block may be invalidated in the source cache. The cache block may be transferred to the target location even if the cache block is not modified (or dirty). In some embodiments, if the target location is the main memory system, the cache block need not be transferred if the cache block is not dirty since the main memory system already has a copy of the cache block.

The PushSh instruction may be used by a thread which has operated upon a cache block (or blocks) and reaches a point at which it becomes likely that the next access to the cache block will be performed by another thread (perhaps executing on another processor). By pushing the block to a target location that is shared with the other processor (that is executing the other thread), the read latency for the other thread may be reduced as compared to the latency that would occur if the block was obtained from the private caches of the processor using the coherence mechanism implemented in the system. Thus, the PushSh instruction may be a performance hint to the processor and system hardware, indicating that the cache block may be moved to a target location that is better, from a latency standpoint, for providing the cache block to a different processor. In some implementations, the target location may be in the main memory system, although the definition of the PushSh instruction does not require that the target location be in the memory system. Additionally, the definition of the PushSh instruction does not require that any data that is modified with respect to the main memory system be written to the main memory system due to execution of the PushSh instruction. Such operation is not prohibited, but is not required. Some implementations may even implement the PushSh instruction as a "no operation" (noop) instruction that has no effect. For example, the PushSh instruction may be nooped if the target location would already have a copy of the cache block (e.g. the target location is inclusive of the source cache) or if a suitable target location cannot be found that would frequently give a performance benefit.

As mentioned previously, a cache may generally comprise a memory that stores copies of data that are also stored in the main memory system. That is, the system may use a memory address space to address the storage locations in the main memory system. The same memory addresses may be used to locate copies of the data in the caches. The caches may be divided into cache block storage locations, each of which is capable of storing a cache block of data. The cache block may be the unit of allocation and deallocation in the cache, and may be any size in various embodiments (e.g. 32 bytes, 64 bytes, 128 bytes or larger or smaller cache block sizes). The cache blocks may generally be aligned in memory to a cache block boundary. Thus, any cache block that is stored in the cache has a corresponding block of data in the main memory system, although the cache block in the cache may be modified with respect to the corresponding data in the main memory system. A memory address (or more briefly "address" herein) may be searched in a given cache, which may detect a hit if the cache block is stored in the cache or a miss if the cache block is not stored in the cache. The main memory system, on the other hand, always has a copy of the data corresponding to the address and thus there is no concept of hit or miss in the main memory system for a given memory address. Pages of data may be paged in and out of the memory from other storage, such as disks and the like, but such mapping is handled by virtual address mechanisms and not the memory space addresses.

The cache may maintain a cache state for each stored cache block. The cache state may indicate whether or not the cache block is valid, and may also indicate if it is modified with respect to other copies of the cache block in other caches or in the main memory system. The cache state may also indicate coherence state for the cache coherence mechanism implemented by the system, if any.

Turning now to FIG. 1, a high level block diagram of one embodiment of a system 10 is shown. The system 10 may include one or more processors, such as processors 12A-12D shown in FIG. 1. Any number of processors may be included in various embodiments. The system 10 may include one or more private caches 14A-14D, each coupled to the respective processor 12A-12D as shown in FIG. 1. The system 10 may further include shared caches 16A-16B. The shared cache 16A is coupled to the private caches 14A-14B in the illustrated embodiment, and similarly the shared cache 16B is coupled to the private caches 14C-14D. The shared cache is thus coupled to the private caches corresponding to the processors that share that cache. In other embodiments, if there is more than one level of shared cache, a lower level shared cache may be coupled to an upper level shared cache that is shared by one or more of the processors that share the lower level shared cache. Similarly, in other embodiments, there may be multiple levels of private cache, and a lower level private cache may be coupled to an upper level private cache that is private to the same processor. Optionally, the shared caches 16A-16B may be coupled to communicate with each other. Alternatively, the shared caches 16A-16B may communicate only with the main memory system 18.

The processors 12A-12D may be configured to execute the PushSh instruction. Specifically, the PushSh instruction may specify one or more operands, which may be used to form an address corresponding to the cache block to be pushed. There may be one operand specifying the address, or there may be two or more operands that may be combined (e.g. added) to produce the address. The address may be a physical address that specifies the cache block in the main memory system 18. The operands may directly form the physical address, or the operands may form an effective or virtual address that the processors 12A-12D may translate to the physical address using the address translation functionality specified by the processor's instruction set architecture.

A given processor 12A-12D may transmit the PushSh operation and address to the private cache(s) 14A-14D coupled to that processor. For example, the processor 12A is shown perform a PushSh operation having an address "A" to the private cache 14A. It is noted that, while the private caches 14A-14D are shown separate from the processors 12A-12D in FIG. 1 for illustration, the private caches 14A-14D may be an integral part of the processors themselves, tightly coupled to the processor's pipelines.

If the private cache 14A-14D detects a hit for the cache block addressed by address A, the private cache 14A-14D may push the cache block toward the target location (e.g. to a lower level shared cache, or to the main memory system 18, in various implementations). The private cache 14A-14D may also update its cache state for the cache block as well. For at least some cache states (prior to the PushSh instruction), the private cache 14A-14D may invalidate the cache block. In some embodiments, the private cache 14A-14D may invalidate the cache block for any previous cache state. In other embodiments, some previous states may result in a copy being retained, as described in more detail with regard to FIG. 3 below for one embodiment.

If the shared cache 16A-16B receives a cache block due to a PushSh operation (e.g. the shared cache 16A in FIG. 1), the shared cache 16A-16B may retain the cache block. That is, the shared cache 16A-16B may be the target location in this embodiment. In other embodiments, a given shared cache may not be the target location (e.g. if there is more than one level of shared cache or the main memory system is the target location for the implementation). Thus, the term "non-target" cache may generally refer to any cache (private or shared) that is not the target cache for a PushSh operation and the term target location (or target cache) may be used to refer to the location/cache that is the target.

If the pushed cache block is a hit in the target cache, the target cache may update the stored cache block with the pushed cache block (and may update the cache state to match the cache state that the upper level cache had, if the cache state is more permissive than the current cache state in the target cache). If the pushed cache block is a miss in the target cache, the target cache may allocate a cache block storage location to store the pushed cache block. The allocation may cause the eviction of a stored cache block, which may be written back to the main memory system (or a lower level cache than the target cache, if one is present in the system).

In one embodiment, a variation of the PushSh instruction may be provided (via a separate opcode or via another operand of the PushSh instruction). The variation may push the cache block to a location in the home node of the cache block, for distributed shared memory systems. In various embodiments, the location in the home node may be a cache in the home node (e.g. a shared cache in the home node, or even a private cache in the home node); the home node main memory; or a cache or other buffer provided specifically to support the PushSh to the home node. The home node for a given cache block may be the node that includes the main memory that stores the cache block. A variant that pushes the cache block to the home node may be useful for cases in which the processor that is expected to read the cache block does not have a shared cache with the processor that executes the PushSh instruction (e.g. one of the processors 12C-12D, if the processor 12B executes the PushSh to home variant, illustrated as PushShH in FIG. 1). In the embodiment of FIG. 1, for example, the PushShH instruction is executed by the processor 12B and a PushShH operation for the cache block having the address "B" is transmitted to the private cache 14B, the shared cache 16A, and into the shared cache 16B. Any mechanism for transmitting the data to the shared cache 16B for storage may be used. For example, one embodiment may use a technique similar to that described in U.S. Pat. No. 7,155,572. The disclosure of the above patent is incorporated herein by reference in its entirety. To the extent that anything in the incorporated patent conflicts with the material in this application, the material in this application controls.

Figure 2:
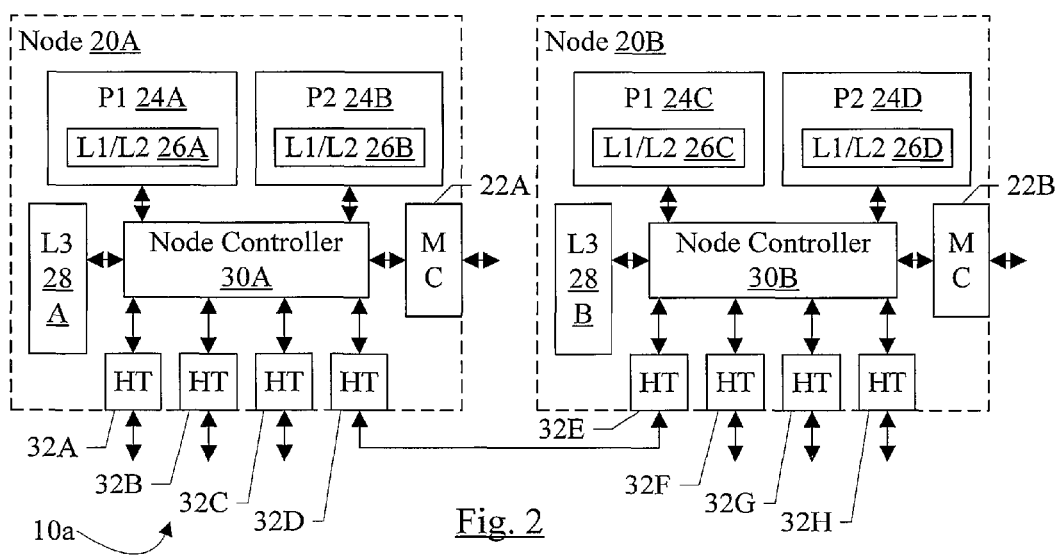
FIG. 2 is a more detailed block diagram of one implementation of the system shown in FIG. 1.

Turning next to FIG. 2, a block diagram of one embodiment of the system 10 (system 10a) is shown in more detail. Numerous other embodiments are possible. In the embodiment of FIG. 2, the system 10a is a multi-node distributed shared memory system. Each node 20A-20B includes a memory controller (MC 22A-22B) that may be coupled to memory modules forming a portion of the main memory system of the system 10a (memory modules not shown in FIG. 2). Together, the memory controllers 22A-22B and the attached memory may be an embodiment of the main memory system 18 shown in FIG. 1. Additionally, each node 20A-20B includes processors (e.g. processors 24A-24D), each processor including L1 and L2 private caches in this embodiment (reference numerals 26A-26D, respectively). A shared L3 cache 28A-28B is included in each node 20A-20B, and is shared by the processors in that node. A node controller 30A-30B couples the processors 24A-24D, the memory controllers 22A-22B, and the L3 caches 28A-28B and routes communications between them. Additionally, the node controller 30A-30B couples HyperTransport™ (HT) interfaces 32A-32H for external communication. The HT interfaces 32D and 32E are coupled to communicate between the nodes 20A-20B. Other nodes (not shown) may be coupled to the nodes 20A-20B via other HT interfaces, or the HT interfaces may be used to couple to various peripheral devices. Other embodiments may use other interconnects to link nodes.

As mentioned above, the L1 and L2 caches 26A-26D may be private caches for the respective processors 24A-24D. That is, the caches 26A-26D may be an embodiment of the private caches 14A-14D shown in FIG. 1. The L3 caches 28A-28B are shared, and thus may be an embodiment of the shared caches 16A-16B shown in FIG. 1. If the processor executes a PushSh instruction, the L1 and L2 caches in that processor push the affected cache block to the L3 cache in the node. If the PushShH variant is implemented, the affected cache block may be pushed to the L3 cache in the home node, the main memory in the home node, or other location in the home node.

In one embodiment, each node 20A-20B may comprise a single integrated circuit, implementing a chip multiprocessor configuration. Other embodiments of the system 10 are contemplated as well. For example, an embodiment of the system 10 may be similar to the standard personal computer configuration having one or more processors coupled via a "front side" interconnect to a northbridge, which includes the memory controller and peripheral interfaces. Still further, embodiments are contemplated in which each processor is coupled to one or more caches in a lookaside or inline configuration, coupled to an interconnect between the lowest level caches and the main memory system (and possibly peripherals).

Figures 3, 4, 5:
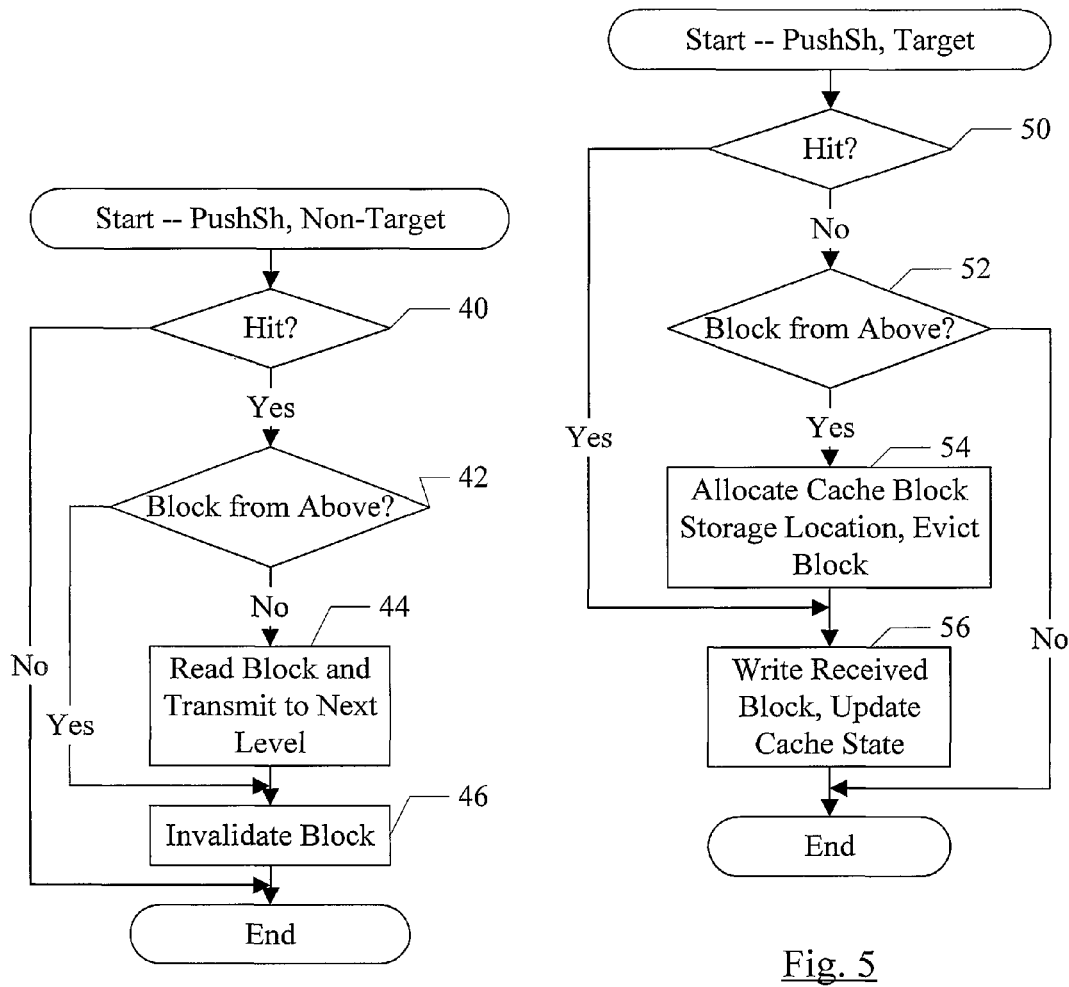
FIG. 3 is a truth table illustrating one embodiment of cache state changes for one embodiment of a push for sharing instruction.
FIG. 4 is a flowchart illustrating operation of one embodiment of a non-target cache in response to a push for sharing instruction.
FIG. 5 is a flowchart illustrating operation of one embodiment of a target cache in response to a push for sharing instruction.

Turning next to FIG. 3, a truth table is shown illustrating an exemplary embodiment of the cache state changes that may occur in one embodiment of PushSh instruction execution. The embodiment of FIG. 3 illustrates the MOESI cache coherency protocol states: Modified, Owned, Exclusive, Shared, and Invalid. In the modified state, the cache block is dirty (i.e. it has been modified compared to the copy of the block stored in memory). In the owned state, the cache block was modified and has subsequently been shared with at least one other cache. The main memory system copy may not have been updated yet, and so the cache having the owned state may have the responsibility to ensure that the main memory system copy is updated. In the exclusive state, the cache has a clean copy of the cache block but no other cache has a copy. In the shared state, the cache has a copy and it is either clean or another cache has ownership of the cache block. In the invalid state, the cache's copy is not valid (e.g. it does not have a usable copy of the cache block). Other embodiments may use other coherency protocols (e.g. MESI, MSI, etc.).

In FIG. 3, the initial state of the cache block in a non-target cache (e.g. a private cache or a shared cache that is not the target of the PushSh instruction) is shown in the left column. The initial state is the state of the cache block in the non-target cache when the PushSh operation is presented to the cache. The corresponding final state in the non-target cache is in the middle column, and the final state in the target cache (when the pushed cache block has been stored therein) is shown in the right column. The target cache final state matches the initial cache state in the non-target cache. In some cases, if the target cache has a cache state that is more permissive (where modified is most permissive and invalid is least permissive) than the cache state from the non-target cache for the pushed cache block, the target cache may retain its own state.

As can be seen in the middle column, the final state in the non-target cache may generally be invalid. In some embodiments, the final state may always be invalid. That is, the cache block may always be invalidated from the non-target cache. However, if the initial state is owned or shared, some embodiments may have a final state of shared for the cache block. In these case of the owned or shared state, coherence activity may be needed before a write may be performed by another processor, and thus there is no advantage to going to the invalid state over the shared state. However, if the cache block is read again by the processor that executes the PushSh instruction, it may have a shared copy to read with low latency.

Turning next to FIG. 4, a flowchart is shown illustrating operation of one embodiment of a non-target cache in response to a PushSh operation. While the blocks are shown in a particular order for ease of understanding, other orders may be used. Blocks may be performed in parallel by combinatorial logic in the non-target cache. Blocks, combinations of blocks, and/or the flowchart as a whole may be pipelined over multiple clock cycles.

The address of the cache block affected by the PushSh operation may be checked against the cache. If the address is a miss (decision block 40, "no" leg), the non-target cache may take no other action (except to pass the PushSh operation on to the next lower level of cache, if any). If the address is a hit (decision block 40, "yes" leg), and the cache does not receive the affected cache block from a higher level cache (decision block 42, "no" leg), the cache may read the block from the cache memory and transmit it to the next lower cache level, along with the cache state and the PushSh operation (block 44). The cache may also invalidate the cache block (block 46). In some embodiments, the cache may retain the block in shared state if the initial state was owned or shared. If the affected cache block is received from the higher cache level (decision block 42, "yes" leg), the cache may pass the received cache block along with the PushSh operation to the next lower cache level and may invalidate the cache block in the cache (block 46). As mentioned previously, in some embodiments, the cache may retain the block in shared state if the initial state was owned or shared.

Turning next to FIG. 5, a flowchart is shown illustrating operation of one embodiment of a target cache in response to a PushSh operation. While the blocks are shown in a particular order for ease of understanding, other orders may be used. Blocks may be performed in parallel by combinatorial logic in the target cache. Blocks, combinations of blocks, and/or the flowchart as a whole may be pipelined over multiple clock cycles.

The address of the cache block affected by the PushSh operation may be checked against the cache. If the address is a miss (decision block 50, "no" leg) and a cache block is received from a higher level cache (decision block 52, "yes" leg), the target cache may allocate a cache block storage location to store the cache block received from the higher level cache. The allocation may involve evicting a cache block currently stored in the cache block storage location (block 54). If the evicted cache block is modified with respect to the main memory system (e.g. the owned or modified cache states of the MOESI protocol), the evicted block may be transferred to the main memory system (or a lower level cache, if any). The target cache may write the received cache block to the allocated storage location (block 56) and may update the cache state to the cache state received from the higher level cache. If the address is a hit (decision block 50, "yes" leg), the cache may write the received cache block (if any) to the cache at the hitting storage location (block 56). Again, the cache may update the stored cache state to the cache state provided from the higher level cache. The PushSh operation is not propagated any further than the target cache, since the target location has been reached.

It is noted that, for an embodiment in which the target location is the main memory system, operation may be similar to that of FIG. 5 except that the cache block is written to memory without any check for a "hit" and there is no state update. The target location may be the main memory system for the PushSh instruction and/or the PushShH variant, in various embodiments.

The above operation of FIGS. 4 and 5 assumes that the cache state of the cache block in a higher level cache is more permissive or the same permissiveness as the cache state at the current level. If that is not the case, the cache may check its own cache state against the cache state provided from the higher level cache, and may provide the more permissive state (FIG. 4) or may update its state to the more permissive state (FIG. 5). Additionally, if the lower level cache has the more permissive cache state, the lower level cache may not update the stored cache block with the received data (e.g. if the lower level cache has modified data and the upper level cache does not, then the data need not be updated).

Figure 6:
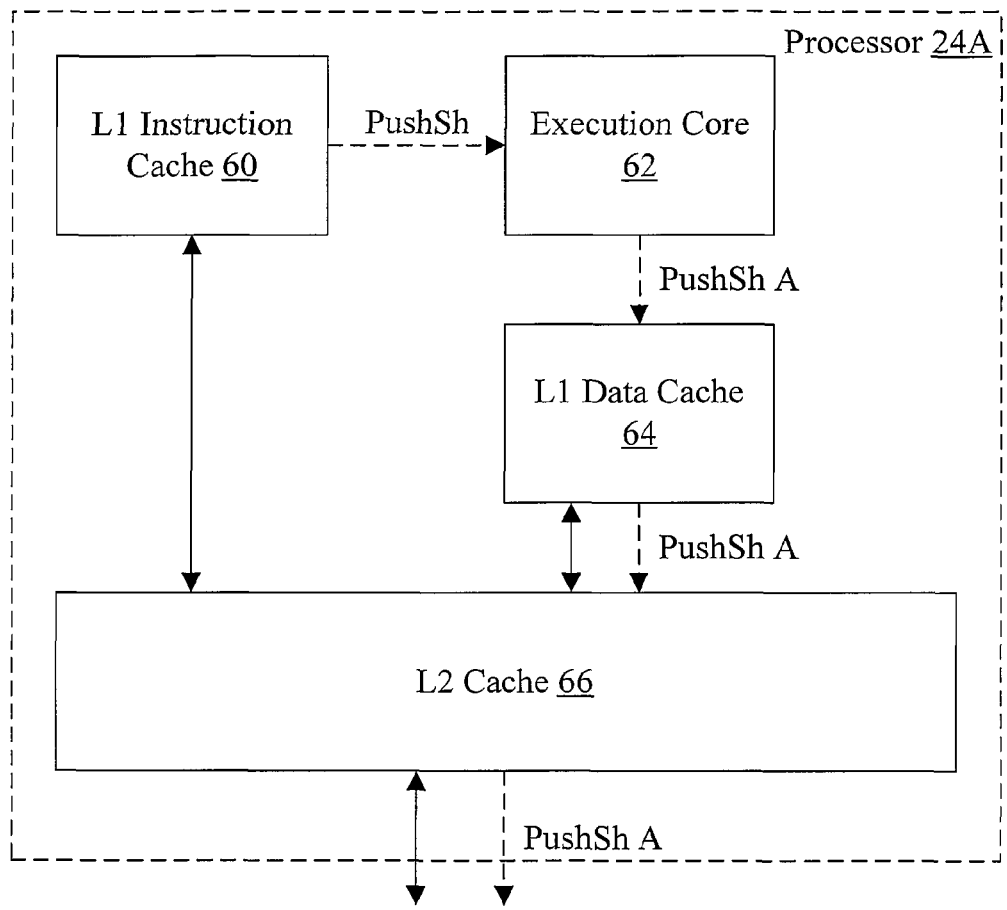
FIG. 6 is a block diagram of one embodiment of a processor.

Turning now to FIG. 6, a block diagram of one embodiment of the processor 24A is shown in more detail. Other processors 24B-24D may be similar. In the illustrated embodiment, the processor 24A includes an L1 instruction cache 60, an execution core 62, an L1 data cache 64, and an L2 cache 66. The caches 60, 64, and 66 together may comprise the L1/L2 cache 26A in FIG. 2. The L1 instruction cache 60 and the L1 data cache 64 are coupled to the L2 cache 66. Additionally, the L1 instruction cache 60 and the L1 data cache 64 are coupled to the execution core 62.

FIG. 6 illustrates the path of a PushSh instruction/operation in the processor 24A. For example, the PushSh instruction may be fetched by the execution core 62 from the instruction cache 60, and may be executed by the execution core 62. The execution may include forming the address of the cache block affected by the PushSh instruction from one or more operands of the PushSh instruction (including translating the effective address to the physical memory address, if applicable). The execution core 62 may transmit a PushSh operation to the L1 data cache 64, including the address "A" of the affected cache block. The L1 data cache 64 may pass the PushSh operation on to the L2 cache 66 (along with the cache block from the L1 data cache 64 and its cache state, if the cache block is a hit in the L1 data cache 64). The L2 cache 66 may pass the PushSh operation to the next lower level cache (e.g. the shared L3 cache 28A). The L2 cache 66 may provide the cache block from the L1 data cache 64, if any, or the cache block from the L2 cache 66, if any, and the corresponding cache state as well.

The caches 60, 64, and 66 may have any desired capacities and configurations (e.g. direct mapped, set associative, etc.). Additionally, some embodiments may implement a shared L1 instruction/data cache. The execution core 62 may implement any desired microarchitecture (e.g. in order or out of order execution, superscalar scalar or scalar, superpipelined, multithreaded or single threaded, etc.).

Figure 7:
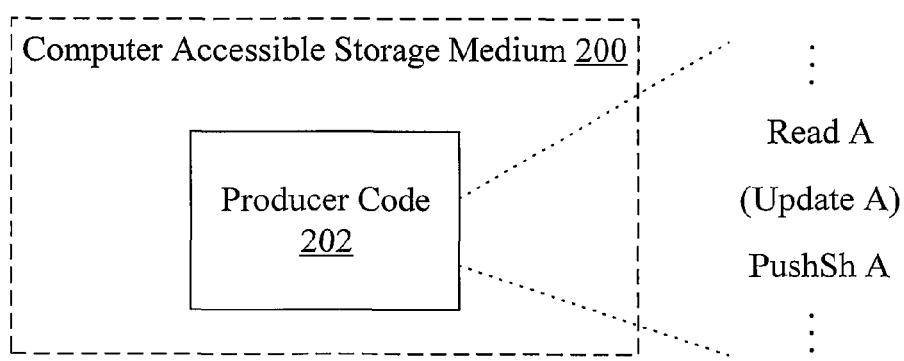
FIG. 7 is a block diagram of one embodiment of a computer accessible storage medium.

Turning now to FIG. 7, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), etc. The media may be insertable into the computer, integrated into the computer (e.g. a fixed disk or RAM), or coupled to the computer via a communication medium such as a network and/or a wireless link. A carrier medium may include computer accessible storage media as well as transmission media such as wired or wireless transmission.

The computer accessible storage medium 200 in FIG. 7 may store producer code 202. The producer code 202 may generally comprises instructions which, when executed, write data to one or more cache blocks and push those blocks using the PushSh instruction to a lower level cache to be shared with a thread executing on another processor. The producer code 202 may be part of many possible usages of the PushSh instruction. For example, the producer code 202 may be used by the producer in any producer/consumer model. Specifically, many types of thread-to-thread communication are performed through memory. Typically, the producer of the communication writes a message to memory, and the consumer reads the message. The producer may write the message, and then may use the PushSh instruction to push the written message to a shared cache from which the consumer may rapidly read the message. Examples of communication mechanisms that may use the instruction include sockets and pipes. Additionally, in semaphore-based locking mechanisms (in which the producer writes the "unlock" value and the consumer reads the value), the producer may write the unlock value and may push the unlock value to the shared cache, where it may be more rapidly read by the consumer to detect the unlock of the semaphore. In distributed shared memory systems, message buffers may be allocated locally to a consumer, and remote writers (in other nodes) may write the message buffers. In typical invalidate-based coherence schemes, the writer reads the local message buffer cache blocks in order to update them. The reader than reads the local message buffer cache blocks (and the coherence mechanism causes the updated data to be transferred back to the reader's node). The data is always in the wrong node, in this case. However, with the PushSh instruction, the writer may push the updated cache blocks back to the home (reader's) node, and thus the messages may be obtained locally by the reader.

The producer code 202 is illustrated, for one embodiment, in exploded view in FIG. 7. The producer code 202 may include instructions to read a cache block "A", instructions to update the cache block as desired, and the PushSh instruction to push the cache block "A" to a shared cache. There may be multiple cache blocks read, updated, and/or pushed and the instructions for different cache blocks may be interleaved.

Numerous variations and modifications will become apparent to those skilled in the art once the above disclosure is fully appreciated. It is intended that the following claims be interpreted to embrace all such variations and modifications.

What is claimed is:
1. An apparatus comprising:
at least a first processor and a second processor;
a first cache coupled to the first processor, wherein the first cache is private to the first processor; and
a second cache coupled to the first cache, wherein the second cache is shared by at least the first processor and the second processor;
wherein the first processor is configured to execute a first instruction, including forming an address responsive to one or more operands of the first instruction, and wherein, responsive to a hit on a first cache block in the first cache by the address, the first cache is configured to transmit the first cache block to the second cache, and wherein the second cache is configured to retain the first cache block responsive to its transmission in response to the first instruction, and wherein the first cache is configured to invalidate the first cache block in the first cache for at least one cache state in the first cache, and wherein the first cache and the second cache are configured not to transmit the first cache block to a home memory location for the first cache block responsive to the first instruction, and wherein the first processor is further configured to execute a second instruction having a different definition than the first instruction in an instruction set architecture implemented by the first processor, and wherein the first processor is configured to form a second address responsive to one or more operands of the second instruction and wherein, responsive to a hit on a second cache block in the first cache by the second address, the first cache is configured to transmit the second cache block to the second cache, and wherein the second cache is configured to retain the second cache block responsive to its transmission in response to the second instruction, and wherein the first cache is configured to invalidate the second cache block in the first cache for at least one cache state in the first cache, and wherein the second cache is configured to transmit the second cache block to a home memory location for the second cache block in addition to retaining the second cache block responsive to the second instruction.

2. The apparatus as recited in claim 1 wherein the first cache is configured to invalidate the first cache block for any cache state in the first cache.

3. The apparatus as recited in claim 1 wherein the first cache is configured to invalidate the first cache block except for the shared or owned state in the first cache, and wherein the first cache is configured to retain the first cache block in the shared state if the previous state is owned or shared in the first cache.

4. The apparatus as recited in claim 1 wherein the second cache is configured to allocate a cache block storage location for the first cache block responsive to detecting a miss for the first cache block in the second cache.

5. The apparatus as recited in claim 4 wherein the second cache is configured to write an evicted cache block from the cache block storage location back to a main memory system responsive to detecting that the evicted cache block is modified with respect to the main memory system.

6. The apparatus as recited in claim 1 further comprising a third cache that is shared by one or more processors including the first processor, and wherein the second cache is a target for the first cache block responsive to the first instruction.

7. The apparatus as recited in claim 1 further comprising one or more additional caches in a cache hierarchy with the first cache and the second cache, and wherein a selection of the second cache as a target for the first instruction is not specified in the definition of the first instruction in the instruction set architecture.

8. A method comprising:
  executing a first instruction in a first processor, the executing including forming an address responsive to one or more operands of the first instruction;
  responsive to a first hit on a first cache block in a first cache by the address, transmitting the first cache block to a third cache that is between the first cache and a second cache, wherein the first cache is private to the first processor and the second cache is shared by at least the first processor and a second processor;
  responsive to a second hit by the address in the third cache, transmitting the first cache block supplied by the first cache to the second cache even though the third cache detects the second hit;
  retaining the first cache block in the second cache responsive to its transmission in response to the first instruction;
  invalidating the first cache block in the first cache for at least one cache state in the first cache;
  not transmitting the first cache block to a home memory location for the first cache block in a main memory system responsive to the first instruction;
  executing a second instruction in the first processor, the second instruction having a different definition than the first instruction in an instruction set architecture implemented by the first processor, wherein the executing includes forming a second address responsive to one or more operands of the second instruction;
  responsive to a hit on a second cache block in the first cache by the second address, transmitting the second cache block to the second cache;
  transmitting the second cache block to a home memory location for the second cache block in the main memory system in addition to retaining the second cache block in the second cache responsive to the second instruction.

9. The method as recited in claim 8 wherein invalidating is performed for any cache state in the first cache.

10. The method as recited in claim 8 wherein invalidating is performed for any cache state in the first cache except for the shared or owned state in the first cache, and the method further comprising retaining the first cache block in the shared state if the previous state is owned or shared in the first cache.

11. The method as recited in claim 8 further comprising allocating a cache block storage location for the first cache block in the second cache responsive to the first cache block missing in the second cache.

12. The method as recited in claim 8 wherein a system including the first processor, the second processor, the first cache, the second cache; and the third cache further comprises a fourth cache that is shared by one or more processors including the first processor, and wherein the second cache is a target for the first cache block responsive to the first instruction.

13. The method as recited in claim 8 wherein a system including the first processor, the second processor, the first cache, the second cache, and the third cache further comprises one or more additional caches in a cache hierarchy with the first cache, the second cache, and the third cache, and wherein a selection of the second cache as a target for the first instruction is not specified in the definition of the first instruction in the instruction set architecture.

14. A system comprising:
  a first processor;
  a main memory system; and
  a cache hierarchy coupled between the first processor and the main memory system, wherein the cache hierarchy comprises at least a first cache and a second cache;
  wherein the first processor is configured to execute a first instruction, including forming an address responsive to one or more operands of the first instruction, and wherein the system is configured to push a first cache block that is hit by the first address in the first cache to a target location within the cache hierarchy or the main memory system, wherein the target location is unspecified in a definition of the first instruction within an instruction set architecture implemented by the first processor, and wherein the target location is implementation-dependent, and wherein the second cache is coupled to receive the address and the first cache block from the first cache, and wherein the second cache is configured to provide the first cache block to a next level in the cache hierarchy responsive to the first instruction even in the case that the address hits in the second cache.

15. The system as recited in claim 14 wherein the cache hierarchy comprises one or more caches that are private to the first processor, including the first cache, the second cache, and one or more shared caches, and wherein the target location is in one of the one or more shared caches.

16. The system as recited in claim 15 wherein the first cache block is invalidated in the one or more private caches responsive to the first instruction.

17. The system as recited in claim 15 wherein a first shared cache that is one of the one or more shared caches and that is the target location is configured to allocate storage for the first cache block.

18. The system as recited in claim 17 wherein the first shared cache is configured to write an evicted cache block from the allocated storage to the main memory system responsive to detecting that the evicted cache block is modified with respect to the main memory system.

19. The system as recited in claim 14 wherein the cache hierarchy is configured not to transmit the first cache block to a home memory location for the first cache block in the main memory system responsive to the first instruction, and wherein the first processor is further configured to execute a second instruction having a different definition than the first instruction in an instruction set architecture implemented by the first processor, and wherein the first processor is configured to form a second address responsive to one or more operands of the second instruction and wherein, responsive to a hit on a second cache block in the first cache by the second address, the first cache is configured to transmit the second cache block to the target location, and wherein the cache hierarchy is configured to transmit the second cache block to a home memory location for the second cache block in the main memory system in addition to retaining the second cache block at the target location responsive to the second instruction.

* * * * *